(12) United States Patent
Kelson et al.

(10) Patent No.: US 9,917,426 B1
(45) Date of Patent: Mar. 13, 2018

(54) RECLAIMATION OF SCRAP COPPER AND OTHER METALS BY WATERBLASTING IN A ROTATING CYLINDER

(71) Applicants: Arnold A. Kelson, Papillion, NE (US); James H. Boyle, Omaha, NE (US)

(72) Inventors: Arnold A. Kelson, Papillion, NE (US); James H. Boyle, Omaha, NE (US)

(73) Assignee: Arnold A. Kelson, Papillion, NE (US)

(*) Notice: Subject to any disclaimer, the term of this patent is extended or adjusted under 35 U.S.C. 154(b) by 177 days.

(21) Appl. No.: 14/998,682

(22) Filed: Feb. 2, 2016

Related U.S. Application Data

(60) Provisional application No. 62/283,453, filed on Sep. 1, 2015.

(51) Int. Cl.
| | | |
|---|---|---|
| *C22B 15/00* | (2006.01) | |
| *H02G 1/12* | (2006.01) | |
| *H01B 15/00* | (2006.01) | |
| *B08B 3/02* | (2006.01) | |

(52) U.S. Cl.
CPC .............. *H02G 1/1285* (2013.01); *B08B 3/02* (2013.01); *H01B 15/00* (2013.01)

(58) Field of Classification Search
CPC ......... H02G 1/1285; B08B 3/02; H01B 15/00
See application file for complete search history.

(56) References Cited

U.S. PATENT DOCUMENTS

| | | | | |
|---|---|---|---|---|
| 3,830,677 A * | 8/1974 | Paulin | .................. | H02G 1/1287 |
| | | | | 156/345.17 |
| 4,064,884 A * | 12/1977 | Asp | .......................... | B08B 3/00 |
| | | | | 134/10 |
| 4,281,444 A * | 8/1981 | Smith | ..................... | B29B 17/02 |
| | | | | 225/99 |
| 4,593,772 A | 6/1986 | Kelley | | |
| 4,854,091 A | 8/1989 | Hashish et al. | | |
| 4,931,140 A * | 6/1990 | Peltola | .................... | B26F 3/004 |
| | | | | 162/193 |
| 5,142,950 A * | 9/1992 | Takano | ................ | H02G 1/1268 |
| | | | | 29/825 |
| 5,904,610 A * | 5/1999 | Ciniglio | ............... | H02G 1/1285 |
| | | | | 451/38 |
| 6,130,404 A * | 10/2000 | Campagna | ........... | B23K 26/073 |
| | | | | 219/121.69 |
| 6,905,396 B1 | 6/2005 | Miller et al. | | |
| 7,680,428 B2 | 3/2010 | Sakato et al. | | |
| 7,993,470 B2 | 8/2011 | West et al. | | |
| 8,007,563 B1 * | 8/2011 | Kelson | .................... | C22B 7/005 |
| | | | | 264/504 |
| 9,168,634 B1 * | 10/2015 | Kelson | .................... | B24C 3/081 |
| 9,475,173 B1 * | 10/2016 | Kelson | .................... | B24C 3/081 |
| 2010/0213106 A1 | 8/2010 | Ben | | |

* cited by examiner

*Primary Examiner* — Robert J Grun

(74) *Attorney, Agent, or Firm* — James D. Welch

(57) ABSTRACT

A system and method that applies a rotating cylinder within which is mounted water jetting apparatus that when applied, causes high pressure water jets to be ejected from nozzles onto combined non-metal and metal substrate materials, and thereby separate non-metal and metal components from one another.

25 Claims, 3 Drawing Sheets

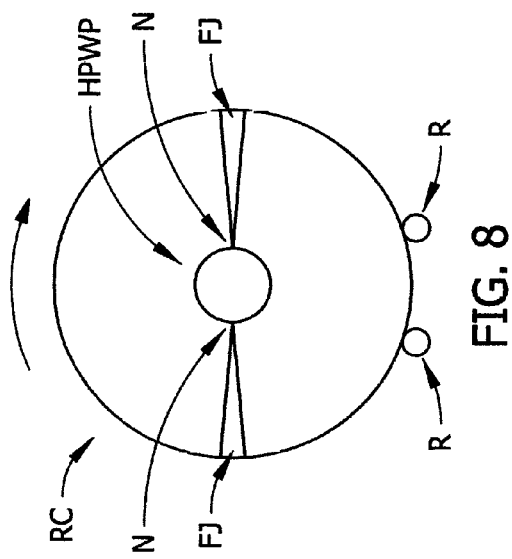
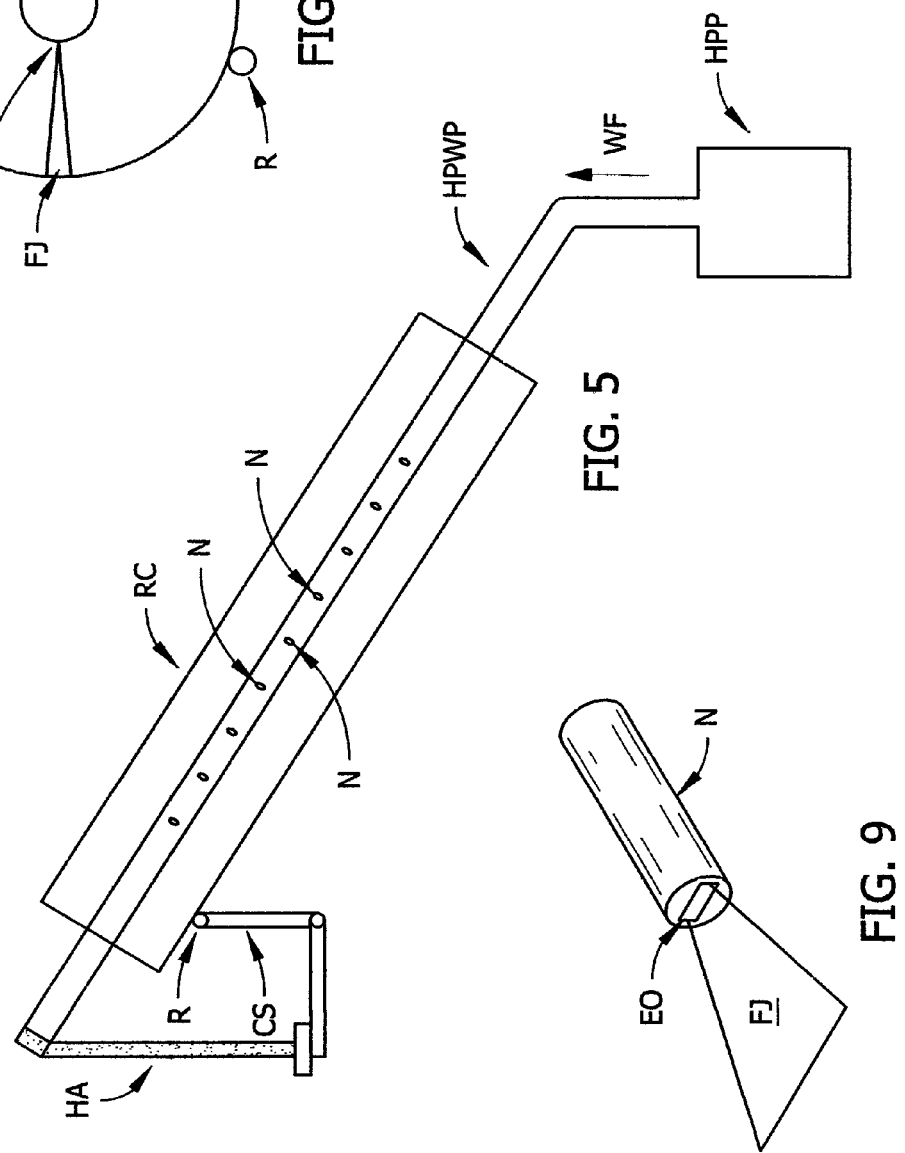

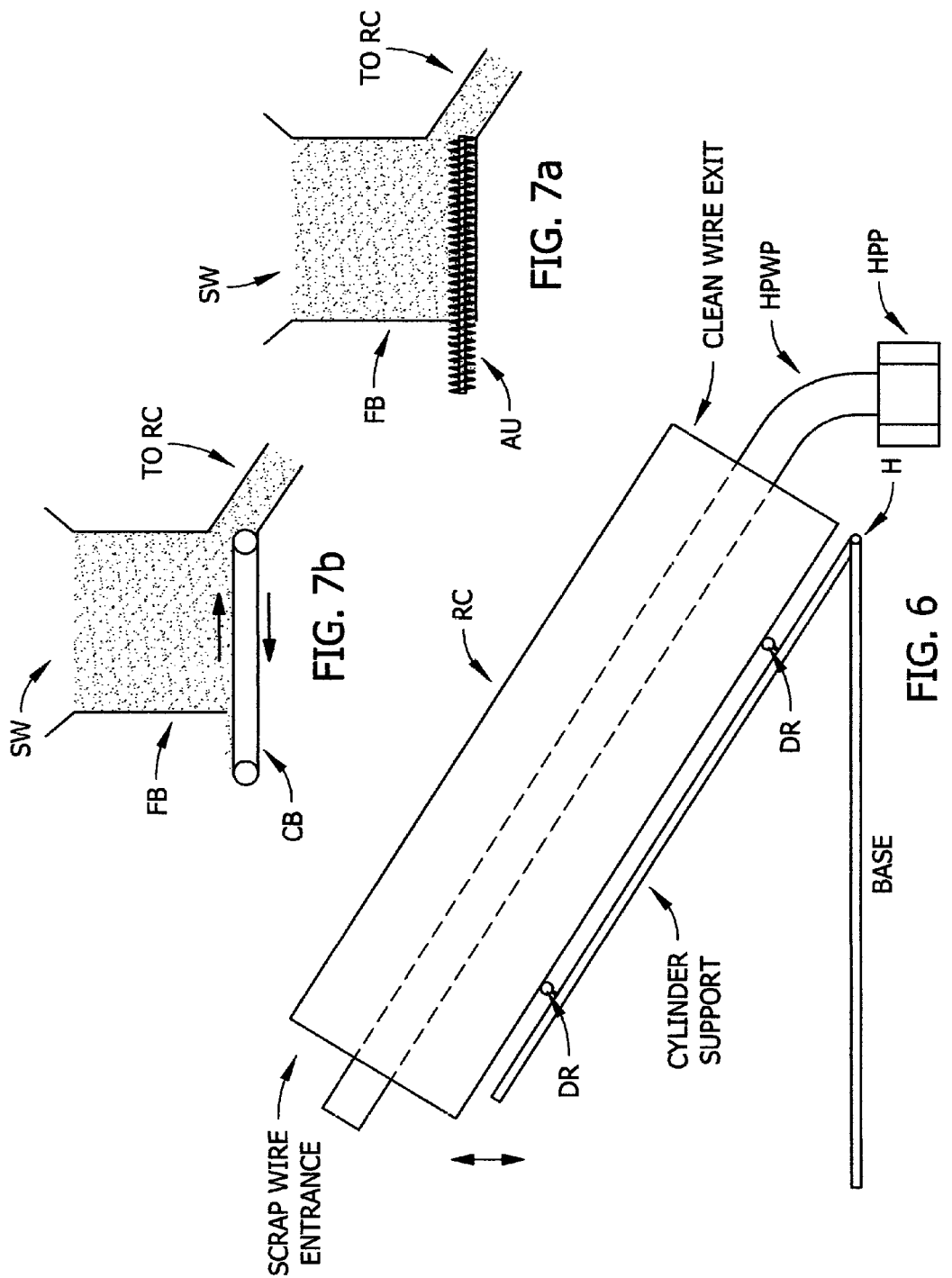

RECLAIMATION OF SCRAP COPPER AND OTHER METALS BY WATERBLASTING IN A ROTATING CYLINDER

This Applications Claims benefit of 62/283,453 filed Sep. 1, 2015.

TECHNICAL AREA

The present invention relates to systems and method for removing non-metal from metal components of substrate materials, and more particularly to a system and method comprising a rotating cylinder within which is mounted water jetting apparatus that when applied, causes high pressure water jets to be ejected from nozzles onto combined non-metal and metal substrate materials, and thereby separate non-metal and metal components from one another.

BACKGROUND

It is known to use water-jetting to remove coatings from underlying metals in such as wires and cables. For instance see Patents to Inventor herein Kelson, U.S. Pat. Nos. 9,168,634 and 8,007,563, which are incorporated hereinto by reference. These Patents describe, respectively, systems and methods for flowing a fluid, (eg water), onto a cable which comprises an outer jacket and a plurality of coverings on metal wires to simultaneously remove a substantial majority of outer jacket, and at least some of at least one covering on metal wires; and impacting a fluid onto wires, bundle of wires, coil of wires and/or cables or other electronic equipment/components having one or more covering materials.

While said Patents describe systems and methods that provide utility on perhaps an industrial large scale operation, need remains for systems and methods that, while applicable to large scale operations, can be easily adapted to smaller scale operations. With the present invention in mind, a recent Patent Search was conducted. The results provided six references which are, as the Searcher put it, are not 5-Star, or even 3-Star hits. At best they are 1-Star hits, and subsequent study has indicated that they are not particularly relevant at all. The Patents identified are:

U.S. Pat. No. 4,854,091 to Hashish et al.;
U.S. Pat. No. 6,905,396 to Miller et al.;
U.S. Pat. No. 7,680,428 to Sakato et al.;
U.S. Pat. No. 7,993,470 to West et al.;

and one Published Application was also identified:

No. US2010/0213106 by Ben.

Even in view of the known prior art, need remains for a water-jetting system that, while it can be easily adaptable to application in smaller scale operations, it can also be increased in size to accommodate larger quantities by enlarging the length and/or diameter of the cylinder.

DISCLOSURE OF THE INVENTION

The present invention comprises a system for removing non-metal from metal components in scrap substrate material such as wires, cables and tangles of wires that have at least one covering thereupon, comprising:

a rotating cylinder having provision at an at least partially open input end thereof for entering substrate material thereinto and an at least partially open end distal from said input end for allowing said substrate material to exit therefrom; and at least one waterjet nozzle oriented within said rotating cylinder.

In use, while said rotating cylinder is caused to rotate about an axis substantially coincided with a central longitudinal axis thereof, substrate material is entered into the at least partially open input end of said rotating cylinder, travel therethrough and exits from said at least partially open end distal therefrom, while water is caused to exit said at least one waterjet nozzle and interact with said substrate material, to the end that at least some non-metal present in said substrate material is dislodged from said metal.

The rotating cylinder is preferably oriented to encourage substrate material to pass therethrough under the influence of gravity by placing the input end thereof is at a higher position that the output end distal therefrom.

While not preferred, the at least one waterjet can be oriented to eject water in a direction that encourages substrate material to move from the at least partially open input end of said rotating cylinder toward said least partially open end distal from said input end wherefrom substrate material exits therefrom.

It is noted that, importantly, the at least one waterjet nozzle comprises a plurality of waterjet nozzles.

A non-preferred system provides that the at least one waterjet nozzle is movable along an axis substantially coincided or parallel with said central longitudinal axis thereof, and ejects water substantially perpendicular to an interior wall of the rotating cylinder.

A preferred embodiment provides that the at least one waterjet nozzle is solidly fixed to a high pressure water carrying pipe oriented substantially coincided with said central longitudinal axis of said cylinder at or near the longitudinal middle thereof, and ejects water substantially perpendicular to an interior wall of the rotating cylinder.

A preferred embodiment also provides that said rotating cylinder has at least one region that allows viewing the interior thereof from outside thereof and wherein said at least one region is positioned so as not to be significantly impacted by water ejected from said waterjet nozzle. Said at least one region is typically a window comprising material transparent to visual range electromagnetic wavelengths.

A present invention system provides that said rotating cylinder rests atop rotating driver rollers that are caused to rotate, thereby effecting cylinder rotation, said cylinder rotation being controllable as to starting, rotational speed and stopping. Other rotation effecting approaches, (not shown in functionally oriented disclosure), are also within the scope of the invention, such as use of gears or driving belts or chains, or cranks etc.

The present invention system can provide that the at least partially open input end of said cylinder is fully open and has a shape selected from the group consisting of:

simply open; and
flared outward in a horn shape to allow easier entry of substrate material.

In addition, the at least partially open end distal from said input end of the cylinder can be fully open to allow easier exit of processed substrate material.

A method for removing non-metal from metal components in scrap substrate material such as wires, cables and tangles of wires that have at least one covering thereupon, comprising the steps of:

a) providing a system as just described:

b) while said rotating cylinder is caused to rotate about an axis substantially coincided with a central longitudinal axis thereof, entering substrate material into the at least partially open input end of said rotating cylinder, travel therethrough and exits from said at least partially open end distal therefrom;

c) simultaneous with step b), causing water to exit said at least one waterjet nozzle and interact with said substrate material;

to the end that at least some non-metal present in said substrate material is dislodged from said metal.

Said method can involve that the rotating cylinder is oriented to encourage substrate material to pass therethrough under the influence of gravity by placing the input end thereof is at a higher position that the output end distal therefrom.

Said method can involve that the at least one waterjet is oriented to eject water in a direction that encourages substrate material to move from the at least partially open input end of said rotating cylinder toward said least partially open end distal from said input end wherefrom substrate material exits therefrom.

Said method can, preferably, involve the at least one waterjet nozzle comprises a plurality of waterjet nozzles.

Said method can, in non-preferred embodiment, provide that the at least one waterjet nozzle is movable along an axis substantially coincided or parallel with said central longitudinal axis thereof and is caused to move therealong in at least one direction while water is caused to be ejected therefrom.

Said method can involve that the at least one waterjet nozzle is solidly fixed to a high pressure water carrying pipe oriented substantially coincided with said central longitudinal axis of said cylinder at or near the longitudinal middle thereof, and ejects water substantially perpendicular to an interior wall of the rotating cylinder.

Said method can involve that said rotating cylinder has at least one region that allows viewing the interior thereof from outside thereof and wherein said at least one region is positioned so as not to be significantly impacted by water ejected from said waterjet nozzle.

Said method can involve that said at least one region is a window comprising material transparent to visual range electromagnetic wavelengths and an observer observes what is inside said rotating cylinder during use.

Said method can involve that said rotating cylinder rests atop rotating driver rollers that are caused to rotate thereby effecting cylinder rotation, said cylinder rotation being controllable as to starting, rotational speed and stopping.

Said method can apply that a jack-type mechanism is applied to cause the open input end of said rotating cylinder to be at a higher level than the at least partially open end distal from said input end for allowing said substrate material to exit therefrom.

Said method can provide that the at least partially open input end of said cylinder is fully open and has a shape selected from the group consisting of:
  simply open; and
  flared outward in a horn shape to allow easier entry of substrate material.

A method can involve that the at least partially open end distal from said input end of the cylinder is fully open to allow easier exit of processed substrate material.

Said method can involve, during use, the at least partially open input end of said rotating cylinder is fed substrate material from a feed bin, and that can be augmented by an auger or conveyor belt drive mechanism.

The present invention will be better understood by reference to the Detailed Description of this Specification, in combination with the Drawings.

BRIEF DESCRIPTION OF THE DRAWINGS

FIG. 5 shows a variation on FIG. 1, wherein pressure water pipe, as in FIG. 4, is substantially centrally located in the Rotating Cylinder and is indicated as being height adjustable and provided water by a high pressure pump.

FIG. 6 shows a variation on FIGS. 1 and 5, wherein the Rotating Cylinder is supported by a hinged mechanism.

FIGS. 7a and 7b show that a feeding bin can be fitted with an auger or conveyor belt drive, and applied to enter scrap material into the Rotating Cylinder.

FIG. 8 shows an elevational drawing looking into the rotating cylinder much like FIG. 2a, but emphasizing the nozzle provides a water jet with a fan shape.

FIG. 9 shows a nozzle capable of providing a fan-shaped water jet.

DETAILED DESCRIPTION

Figure 1:
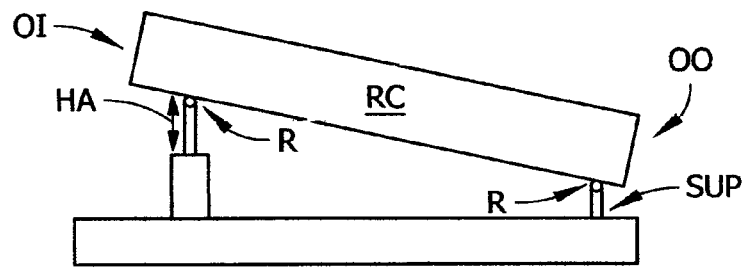
FIG. 1 shows a very basic present invention Rotating Cylinder for processing scrap substrate material, said Rotating Cylinder being supported atop rollers and being adjustable in slope.
Figure 3:
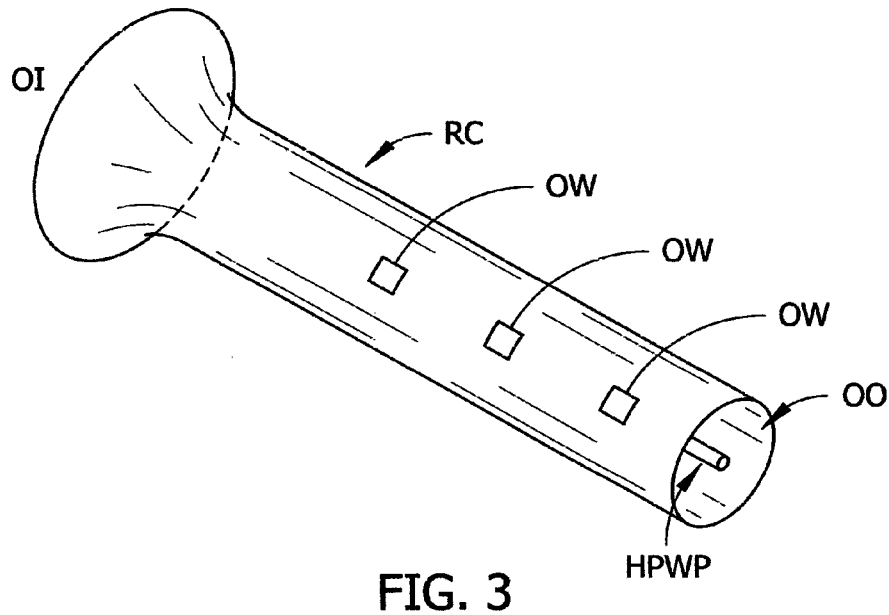
FIG. 3 demonstrates that a Rotating Cylinder can have an enlarged substantially open input and observation windows.

FIG. 1 shows a very basic present invention Rotating Cylinder (RC) for processing scrap substrate material, said Rotating Cylinder (RC) being supported atop rollers (R) and being adjustable in slope by a jack-type mechanism (HA). FIG. 1 shows a Rotating Cylinder (RC) for accepting scrap substrate material at it's Entry end (OI), (to the left), wherein it is subjected to waterjets that exit nozzles (N) (see FIG. 4), and from which it exits at the Exit end (OO) thereof. Note, the FIG. 3 presence of optional Observation Windows (OW). The present invention relies primarily on gravity to cause substrate material entered thereinto, to move down the height gradient and exit therefrom. While not preferred however, it is possible to orient the Waterjets inside the Rotating Cylinder (RC) to provide some impetus for substrate material to move from the Entrance (OI) to the Exit (OO) as well. However, preferred practice provides that the Waterjets be directed to eject water so that it impinges onto an inner wall of the Rotating Cylinder (RC) along a perpendicular thereto to better remove coatings from scrap substrate. FIG. 3 shows an optional demonstrative flared Input end (OI) of the Rotating Cylinder (RC). This makes it easier to enter substrate material thereinto. Both the Input (OI) and Exit (OO) ends of the Rotating Cylinder (RC) can be partially closed, but preferred practice is to leave them unobstructed and completely open.

Figure 2A:
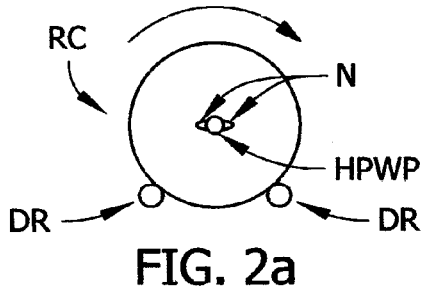
FIGS. 2a and 2b show a Rotating Cylinder can be caused to rotate by drive wheels or a drive belt/chain.
Figure 2B:
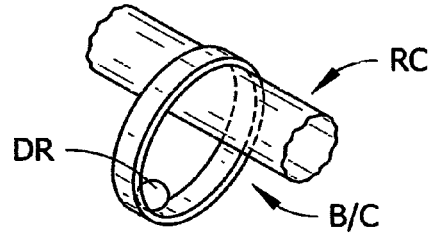

FIG. 2a shows the Rotating Cylinder of FIG. 1 atop rotating drive rollers (DR). These drive rollers are the rollers of FIG. 1 with a power providing capability that causes the Rotating Cylinder to rotate. FIG. 2b shows that the Rotating Cylinder (RC) can be caused to rotate by application of a belt or chain (B/C) which is driven by a Drive Roller (DR) or functional equivalent.

Figure 4:
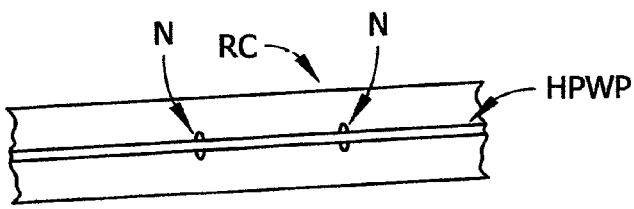
FIG. 4 demonstrates Nozzles attached to a high pressure water carrying input pipe, and demonstrates relative sizes of the Rotating Cylinder and said nozzles.

Note, FIGS. 4 and 8 show Nozzles (N) are present inside the Rotating Cylinder (RC), and can project horizontally only as an example, or can be directed in any 360 degree direction around the High Pressure Water Pipe (HPWP). While it is within the scope of the invention to mount Nozzles (N) so that they can be moved in a longitudinal direction between input (OI) and output (OO) ends within the Rotating Cylinder (RC), preferred practice provides that they are permanently affixed to a High Pressure Water Pipe (HPWP). FIG. 4 demonstrates Nozzles firmly attached to a High Pressure Water Pipe (HPWP), which in use projects substantially along a central longitudinal axis of said Rotating Cylinder (RC), about which the Rotating Cylinder (RC) effectively rotates during use. FIG. 4 can be considered as an elevational cross section. This is preferred, and it is noted that the Nozzles (N) are preferably located centrally within the longitudinal length of the Cylinder. It is also noted that while only two Nozzles (N) each are shown in FIG. 4, it is typical to provide a tightly grouped plurality thereof. Further, it is noted that while not a limitation, it is preferable that the waterjets direct spray therefrom substantially horizontally, rather than in a vertical direction within the Rotating Cylinder (RC), (see FIG. 8, which is looking into the Output end (OO) of the Rotating Cylinder (RC). Said nozzle (N) size is shown with respect to Rotating Cylinder (RC) size as a representative indication that the nozzles (N) should be small enough as to not impede scrap material progressing through the Rotating Cylinder (RC) in use.

FIG. 5 shows a Rotating Cylinder (RC) in elevational cross section, demonstrating a plurality of nozzles (N) along the length of a high pressure water pipe (HPWP) that is fed high pressure water from a high pressure pump (HPP). Indicated is a water flow (WF). Note that the High Pressure Water Pipe (HPWP) is indicated as being adjustable in slope from left to right by a jack-like system (HA), and that the Rotating Cylinder (RC) is indicated as setting atop rollers (R), which are supported by a rigid cylinder support (CS). As shown in FIG. 1, however, the Rotating Cylinder can also be supported by a jack-like system (HA) in FIG. 1.

FIG. 6 demonstrates that the Rotating Cylinder (RC) can be supported via drive rollers (DR) which are affixed in a hinge-like (H) mechanism for effecting Rotating Cylinder (RC) slope.

FIGS. 7*a* and 7*b* indicate that scrap waste (sw) substrate (eg. wire, coils, bundles or tangles of wires, and/or cables etc.) can be fed to a Rotating Cylinder (RC) by an auger (AU) or conveyor belt (CB) drive mechanism, from a feed bin (FB).

FIG. 8 shows an elevational drawing looking into the rotating cylinder (RC) much like FIG. 2*a*, but emphasizing the nozzles (N) provide an exiting water jet with a fan shape (FJ).

FIG. 9 shows a nozzle (N) capable of providing an elongated exit (EO) to provide a fan shaped (FJ) water jet. Note, this is not a limiting nozzle shape, and, for instance, a needle shaped nozzle can be applied, as the nozzles in other Figures can be interpreted to be.

Having hereby disclosed the subject matter of the present invention, it should be obvious that many modifications, substitutions, and variations of the present invention are possible in view of the teachings. It is therefore to be understood that the invention may be practiced other than as specifically described, and should be limited in its breadth and scope only by the Claims.

We claim:
1. A system for removing non-metal from metal components in scrap substrate material such as wires, cables and tangles of wires that have at least one covering thereupon, comprising:
   a rotating cylinder having an at least partially open input end for input of substrate material and an at least partially open output end distal from said input end for allowing said substrate material to exit therefrom;
   at least one waterjet nozzle oriented within said rotating cylinder;
   a supplier for providing a substrate material into the at least partially open input end of the rotating cylinder;
   a source of rotation for rotating said rotating cylinder about an axis substantially coincident with a central longitudinal axis of said rotating cylinder;
   and a water supply for providing water to said waterjet nozzle so as to cause said water to exit from said nozzle and interact with said substrate material so that at least some non-metal present in said substrate material is dislodged from said metal.

2. A system as in claim 1 in which the rotating cylinder is oriented to encourage substrate material to pass from said at least partially open input end to said at least partially open output end under the influence of gravity by placing the input end thereof at a higher position than the output end distal therefrom.

3. A system as in claim 1 wherein the at least one waterjet is oriented to eject water in a direction that encourages substrate material to move from the at least partially open input end of said rotating cylinder toward said least partially open output end distal from said input end wherefrom substrate material exits therefrom.

4. A system as in claim 1 in which the at least one waterjet nozzle comprises a plurality of waterjet nozzles.

5. A system as in claim 1 in which the at least one waterjet nozzle is movable along an axis substantially coincident or parallel with said central longitudinal axis of said rotating cylinder, and ejects water substantially perpendicular to an interior wall of the rotating cylinder.

6. A system as in claim 1 in which the at least one waterjet nozzle is solidly fixed to a high pressure water carrying pipe oriented substantially coincident with said central longitudinal axis of said cylinder at or near the longitudinal central axis thereof, and ejects water substantially perpendicular to an interior wall of the rotating cylinder.

7. A system as in claim 1 in which said rotating cylinder has at least one region that allows viewing the interior thereof from outside thereof and wherein said at least one region is positioned so as not to be significantly impacted by water ejected from said waterjet nozzle.

8. A system as in claim 7 in which said at 1 one region is a window comprising material transparent to visual range electromagnetic wavelengths.

9. A system as in claim 1 in which said rotating cylinder rests atop rotating driver rollers that are caused to rotate thereby effecting cylinder rotation, said cylinder rotation being controllable as to starting, rotational speed and stopping.

10. A system as in claim 1 in which the at least partially open input end of said cylinder is fully open and has a shape selected from the group consisting of: simply open; and flared outward in a horn shape to allow easier entry of substrate material.

11. A system as in claim 1, in which the at least partially open output end distal from said input end of the cylinder is fully open to allow easier exit of processed substrate material.

12. A system as in claim 1, in which the at least partially open output end distal from said input end of the cylinder is fully open to allow easier exit of processed substrate material.

13. A method for removing non-metal from metal components in scrap substrate material such as wires, cables and tangles of wires that have at least one covering thereupon, comprising the steps of:

a) providing a system comprising:

a rotating cylinder having an at least partially open input end for input of substrate material and an at least partially open output end distal from said input end for allowing said substrate material to exit therefrom;

at least one waterjet nozzle oriented within said rotating cylinder;

a supplier for providing a substrate material into the at least partially open input end of the rotating cylinder;

a source of rotation for rotating said rotating cylinder about an axis substantially coincident with a central longitudinal axis of said rotating cylinder;

and a water supply for providing water to said waterjet nozzle so as to cause said water to exit from said nozzle and interact with said substrate material so that at least some non-metal present in said substrate material is dislodged from said metal;

b) while said rotating cylinder is caused to rotate about an axis substantially coincided with a central longitudinal axis thereof, supplying substrate material into the at least partially open input end of said rotating cylinder, causing said material to travel therethrough and exit from said at least partially open output end distal therefrom;

c) simultaneous with step b), causing water to exit said at least one waterjet nozzle and interact with said substrate material;

such that at least some non-metal present in said substrate material is dislodged from said metal.

14. A method as in claim 13 in which the rotating cylinder is oriented to encourage substrate material to pass from said at least partially open input end to said at least partially open output end under the influence of gravity by placing the input end thereof at a higher position than the output end distal therefrom.

15. A method as in claim 13 wherein the at least one waterjet is oriented to eject water in a direction that encourages substrate material to move from the at least partially open input end of said rotating cylinder toward said least partially open output end distal from said input end wherefrom substrate material exits therefrom.

16. A method as in claim 13 in which the at least one waterjet nozzle comprises a plurality of waterjet nozzles.

17. A method as in claim 13 in which the at least one waterjet nozzle is movable along an axis substantially coincident or parallel with said central longitudinal axis thereof and is caused to move therealong in at least one direction while water is caused to be ejected therefrom.

18. A method as in claim 13 in which the at least one waterjet nozzle is solidly fixed to a high pressure water carrying pipe oriented substantially coincident with said central longitudinal axis of said rotating cylinder at or near the longitudinal middle thereof, and ejects water substantially perpendicular to an interior wall of the rotating cylinder.

19. A method as in claim 13 in which said rotating cylinder has at least one region that allows viewing the interior thereof from outside thereof and wherein said at least one region is positioned so as not to be significantly impacted by water ejected from said waterjet nozzle.

20. A method as in claim 19 in which said at least one region is a window comprising material transparent to visual range electromagnetic wavelengths and an observer observes what is inside said rotation cylinder during use.

21. A method as in claim 14 in which said rotating cylinder rests atop rotating driver rollers that are caused to rotate thereby effecting cylinder rotation, said cylinder rotation being controllable as to starting, rotational speed and stopping.

22. A method as in claim 13 in which a jack-type mechanism is applied to cause the open input end of said rotating cylinder to be at a higher level than the at least partially open output end distal from said input end for allowing said substrate material to exit therefrom.

23. A method as in claim 13 in which the at least partially open input end of said cylinder is fully open and has a shape selected from the group consisting of: simply open; and flared outward in a horn shape to allow easier entry of substrate material.

24. A method as in claim 13, in which, during use, the at least partially open input end of said rotating cylinder is supplied substrate material from a feed bin.

25. A method as in claim 24, wherein the substrate material is supplied from the feed bin via an auger or conveyor belt drive mechanism.

* * * * *